Patented Sept. 1, 1925.

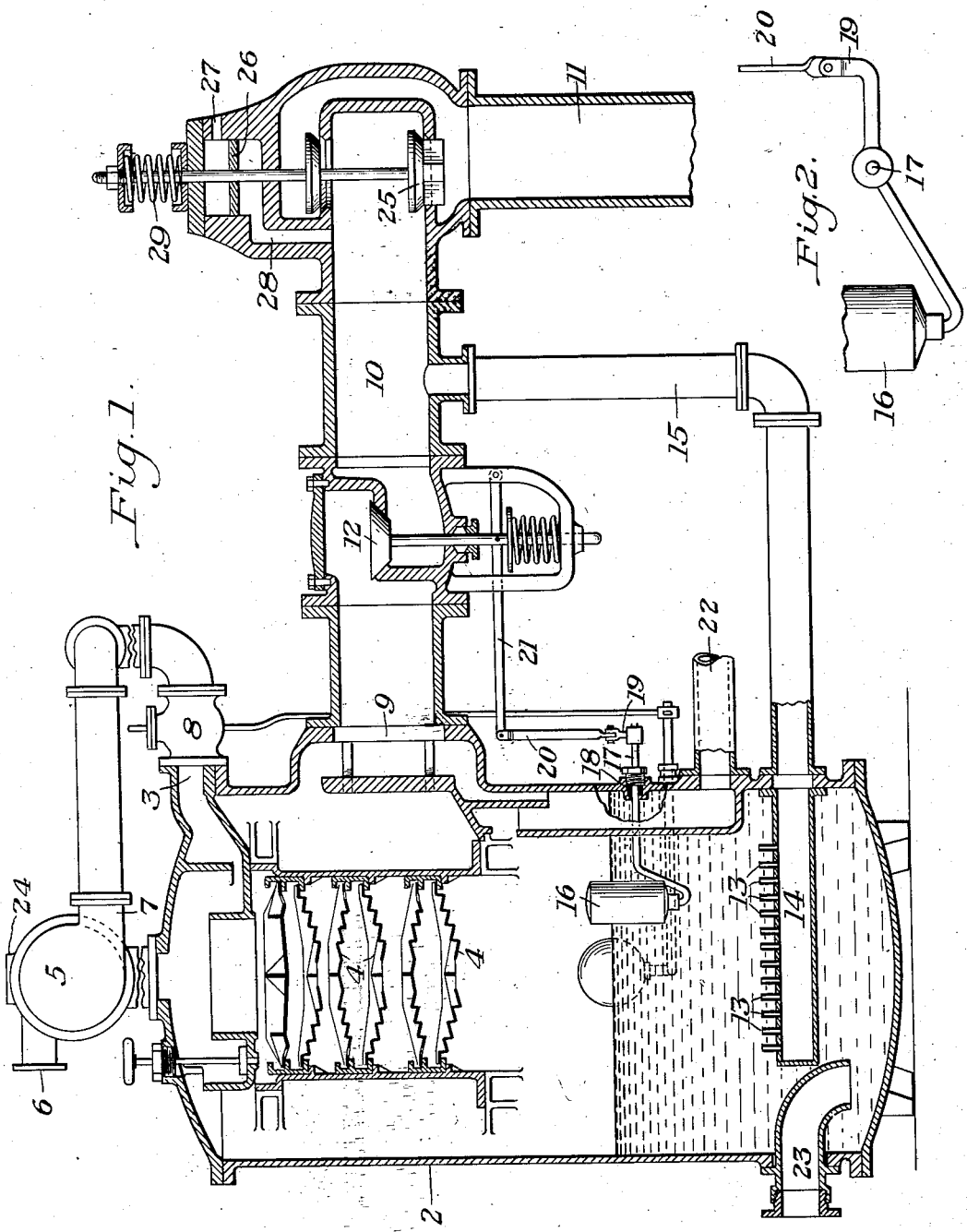

1,552,071

UNITED STATES PATENT OFFICE.

JOHN R. McDERMET, OF JEANNETTE, PENNSYLVANIA, ASSIGNOR TO ELLIOTT COMPANY, OF PITTSBURGH, PENNSYLVANIA, A CORPORATION OF PENNSYLVANIA.

DEAERATING APPARATUS.

Application filed January 12, 1923. Serial No. 612,361.

*To all whom it may concern:*

Be it known that I, JOHN R. McDERMET, a citizen of the United States, residing at Jeannette, Westmoreland County, Pennsylvania, have invented a new and useful Improvement in Deaerating Apparatus, of which the following is a full, clear, and exact description.

The present invention relates broadly to heat exchange apparatus for treating water, and more particularly to a deaerating apparatus.

It is highly desirable, as recognized in the art, to effect the separation from water of as much of the air and other contained gases as possible, particularly where the water is to be used in power plant equipment or apparatus requiring a heat exchanging operation. In this manner the corrosive property of the water is minimized in accordance with the degree of air separation, and the scale and incrustation forming properties are likewise greatly reduced.

At the present time, one method of effecting the desired release of air involves the bubbling of steam through a body of stored water. This stored water may advantageously be contained in a feed water heater of any well known type. Considerable difficulty has been experienced, however, in the control of both the heating steam and the agitating steam which bubbles through the heated water. This invention overcomes these operating difficulties and provides an apparatus embodying controlling means for both the steam and the water whereby the desired amounts for proper operation may be continuously and automatically maintained.

In the accompanying drawings, there is shown more or less diagrammatically for purposes of illustration only, one embodiment of the present invention, it being understood that the drawings do not define the limits of the invention and that changes may be made in the construction and operation disclosed therein without departing from the spirit of the invention or scope of my broader claims.

In the drawings, Figure 1 is a diagrammatic view, partly in section and partly broken away, illustrating one embodiment of the invention, and Figure 2 is a detail view on an enlarged scale of a portion of the float controlling mechanism.

In the illustrated embodiment of the invention, there is provided a feed water heater 2 of the open type having in its upper portion an inlet 3 for the water to be treated. This water is adapted to flow in cascade over a series of agitating pans 4 whereby it is effectively broken up to facilitate the partial release of air and gases therefrom and to permit the more rapid heating of the water. The water may conveniently be supplied to the heater through a condenser 5 having the usual inlet 6, and having its outlet 7 connected to the inlet of the feed water heater. Also, as is customary in this art, the supply of water may be automatically controlled in accordance with the requirements on the apparatus by providing a float operated valve 8 actuated by the water level within the heater.

Heating steam for the entering water may be supplied through a steam inlet 9 fed by a manifold 10 which in turn receives its supply from a live or exhaust steam inlet 11. The passage of steam from the manifold 10 to the inlet 9 is controlled by a differentially unbalanced valve 12 whereby the quantity of the heating steam at the inlet 9 may vary with respect to the steam pressure in the manifold 10 as will be more fully pointed out hereinafter.

Located beneath the surface of the water in the feed water heater is an agitating means which may conveniently comprise a series of nozzles 13 communicating with a common header 14 to which steam is supplied through a branch 15 from the manifold 10. It will be apparent that if the required steam pressure is maintained on the nozzles 13, steam will continuously bubble upwardly through the water to the surface thereof and into the zone of pressure of the heating steam thereabove.

In order to effect the desired bubbling action of the steam, with its consequent agitation of the water whereby release of air and other gases is effected both by flotation and heating, the pressure of the steam on the nozzles 13 must be sufficient to overcome the hydrostatic head of the water on the nozzles and must obviously be greater than the pressure of the heating steam within the upper portion of the feed water heater. This differential pressure from the common manifold 10 is maintained automatically by a differential pressure regulating means of any desired construction, herein illustrated specifically as embodying the valve 12.

As the level of the water in the feed water heater varies, the differential pressure may also vary, decreasing as the hydrostatic head of the water decreases and increasing as the water level and the head created thereby increases. For effecting this control automatically there may be provided a float 16 carried by a rod 17 rotatably mounted in a suitable stuffing box 18 and extending outwardly through the feed water heater. At its outer end it may be offset to provide an arm 19 which is in turn connected by a link 20 with a lever 21. This lever 21 may be operatively connected to the valve 12 in any desired manner whereby as the water level within the feed water heater lowers the valve will be opened to provide additional steam for heating purposes in the upper portion of the feed water heater, and as the water level rises the valve 12 will be moved toward closed position to restrict the amount of heating steam. In this manner, the desired differential pressure is automatically varied as the effective head of water on the nozzles 13 varies, and the supply of heating steam is maintained proportionate to the volume of entering water.

The usual overflow connection 22, together with an outlet connection 23 for the treated water may both be provided.

In some cases, it may be desirable to operate the feed water heater at a temperature corresponding to a pressure which is below atmospheric pressure. In such cases the condenser 5 will tend to withdraw the released vapors and gases from the heater 2 and will thereby maintain the desired thermal conditions within the heater. It will be understood that the particular design of the condenser may be changed in accordance with conditions under which it is desired to operate the heater. Non-condensible gases may be withdrawn from the condenser 5 through the outlet 24 in any desired manner, as by an ejector (not shown). By utilizing such a condenser not only are the desired thermal conditions maintained within the heater, but the sensible heat of the released vapors and gases is conserved and imparted to the incoming water whereby it is partially preheated.

When operating the heater under sub-atmospheric conditions, as just described, it will be obvious that there may exist within the manifold 10 a steam pressure which is also sub-atmospheric. As the present state of the art dictates the advisability of maintaining steam supply lines under a pressure which is at least atmospheric, it is undesirable to have the pressure conditions within the manifold 10 transmitted to the steam supply 11. If such conditions were maintained in the line 11, there would be a corresponding tendency toward air infiltration which would not only contaminate the water but would impair the efficiency of the heater. In order to prevent such an undesirable condition within the steam supply line, there may be provided a balanced valve structure 25 having a piston or diaphragm 26 which is subjected on one side to atmospheric pressure through the port 27 and on the other side to manifold pressure through the passage 28. The manifold pressure may be adjustably augmented by a loading spring 29, whereby the desired operating conditions of the valve are insured. In this manner atmospheric or superatmospheric conditions may be maintained in the steam supply line 11 irrespective of the conditions existing within the heater 2 and the manifold 10.

With contemplated developments in the art, the use of a balanced valve in the steam supply line may be rendered unnecessary as the supply of steam at sub-atmospheric pressures may be made possible. It will be understood, therefore, that while such a valve is both necessary and desirable in certain installations, the operation of the present apparatus is not necessarily dependent thereon in certain cases.

In operation of the heater, although the amount of steam supplied for heating purposes varies in accordance with demands on the heater, the pressure within the heating zone of the heater will obviously remain substantially constant thereby making it necessary to only consider the variation in the water level in determining the essential pressure on the nozzles 13.

The advantages of the present invention arise from the provision of a feed water heater effective for deaerating the water and in which the supply of both steam and water may be efficiently controlled.

I claim:

1. In a water treating apparatus, a feed water heater having a source of heating steam, means for supplying agitating steam below the level of water in the heater, and means operable in accordance with conditions within the heater for maintaining the desired pressure both of the heating and the agitating steam.

2. In a water treating apparatus, a feed water heater having a source of heating steam, means for supplying agitating steam below the level of water in the heater, and means operable in accordance with conditions within the heater and maintaining the desired differential steam pressure to insure the bubbling of the agitating steam through the water.

3. In a water treating apparatus, a feed water heater having a source of heating steam, means for supplying agitating steam below the level of water in the heater, and float controlled means for maintaining the desired differential steam pressure between the heating and the agitating steam.

4. In a water treating apparatus, a feed water heater having a source of heating steam, means for supplying agitating steam below the level of water in the heater, and a differential valve for maintaining the desired differential pressure between the heating and the agitating steam to insure bubbling of the agitating steam through the water, and means for automatically operating said valve.

5. In a water treating apparatus, a feed water heater, means for supplying heating steam to said heater above the level of water therein, means for supplying agitating steam below the level of water therein, and means for maintaining a differential pressure between the heating and agitating steam to insure bubbling of the agitating steam through the water irrespective of the water level within the heater.

6. In a water treating apparatus, a feed water heater, means for supplying heating steam to said heater above the level of water therein, means for supplying agitating steam below the level of water therein, means maintaining a differential pressure between the heating and agitating steam varying in accordance with the amount of water supplied to the heater to insure bubbling of the agitating steam through the water, and a common source of supply for both the heating and the agitating steam.

7. In an open feed water heater, means for supplying water thereto, means for supplying a differential steam pressure above and below the surface of the water therein, the pressure difference being sufficient to force steam from below the water into the zone of pressure thereabove, and means for varying said difference as the water level within the heater varies.

8. In an open feed water heater, means for supplying water thereto, means controlled by the water being heated for supplying a differential steam pressure above and below the surface of the water therein, the pressure difference being sufficient to force steam from below the water into the zone of pressure thereabove, and a common source of supply for said steam.

9. In an open feed water heater, means for supplying water thereto, and float controlled means for supplying a differential steam pressure above and below the surface of the water therein, the pressure difference being sufficient to force steam from below the water into the zone of pressure thereabove.

10. In an open feed water heater, means for supplying water thereto, means for supplying differential steam pressure above and below the surface of the water therein, a source of supply for said steam, and means for maintaining pressure conditions within the source of supply irrespective of the pressure conditions within the heater.

11. In an open feed water heater, means for supplying water thereto, means for supplying differential steam pressure above and below the surface of the water therein, a source of supply for said steam, and means for maintaining a pressure at least atmospheric in the source of steam supply when the pressure within the heater is below atmospheric.

12. In a feed water heater, a source of steam supply, and a float-controlled differential pressure valve for supplying a differential steam pressure from said source above and below the surface of the water within the heater.

13. In a feed water heater, a source of steam supply, a differential pressure valve for supplying a differential steam pressure from said source above and below the surface of the water within the heater, and means for maintaining substantially constant external pressure conditions in said source of steam supply irrespective of pressure conditions within the heater.

In testimony whereof I have hereunto set my hand.

JOHN R. McDERMET.